(12) United States Patent
Berger et al.

(10) Patent No.: US 8,954,868 B2
(45) Date of Patent: Feb. 10, 2015

(54) GUIDED PROFILE EDITING SYSTEM

(71) Applicant: LinkedIn Organization, Mountain View, CA (US)

(72) Inventors: Erran Berger, San Francisco, CA (US); Elliot Shmukler, Palo Alto, CA (US); Aaron Bronzan, San Francisco, CA (US); Luke Liu, Fremont, CA (US); Aleksandr Movsesyan, San Bruno, CA (US); Amy Parnell, Belmont, CA (US); Andrew Lottman, Mountain View, CA (US); Avery Randolph Moon, Redwood Shores, CA (US)

(73) Assignee: LinkedIn Corporation, Mountain View, CA (US)

( * ) Notice: Subject to any disclaimer, the term of this patent is extended or adjusted under 35 U.S.C. 154(b) by 23 days.

(21) Appl. No.: 13/673,815

(22) Filed: Nov. 9, 2012

(65) Prior Publication Data

US 2014/0137004 A1    May 15, 2014

(51) Int. Cl.
*G06F 3/00* (2006.01)
*G06F 3/048* (2013.01)

(52) U.S. Cl.
CPC .................................... *G06F 3/048* (2013.01)
USPC ......................................................... 715/760

(58) Field of Classification Search
None
See application file for complete search history.

(56) References Cited

U.S. PATENT DOCUMENTS

| | | | | |
|---|---|---|---|---|
| 7,543,232 | B2 * | 6/2009 | Easton et al. | 715/708 |
| 7,725,525 | B2 * | 5/2010 | Work | 709/202 |
| 8,296,660 | B2 * | 10/2012 | Macadaan et al. | 715/751 |
| 8,442,331 | B2 * | 5/2013 | King et al. | 382/229 |
| 2006/0026114 | A1 * | 2/2006 | Gregoire et al. | 707/1 |
| 2007/0162501 | A1 * | 7/2007 | Agassi et al. | 707/104.1 |
| 2007/0185721 | A1 * | 8/2007 | Agassi et al. | 705/1 |
| 2008/0209339 | A1 * | 8/2008 | Macadaan et al. | 715/745 |
| 2008/0209343 | A1 * | 8/2008 | Macadaan et al. | 715/747 |
| 2009/0055404 | A1 * | 2/2009 | Heiden et al. | 707/10 |
| 2009/0216563 | A1 * | 8/2009 | Sandoval et al. | 705/3 |
| 2010/0169960 | A1 * | 7/2010 | Davies et al. | 726/7 |
| 2011/0107245 | A1 * | 5/2011 | Dantzler et al. | 715/769 |
| 2011/0191717 | A1 * | 8/2011 | Cort et al. | 715/816 |
| 2012/0191715 | A1 * | 7/2012 | Ruffner et al. | 707/738 |
| 2012/0191776 | A1 * | 7/2012 | Ruffner et al. | 709/204 |

(Continued)

OTHER PUBLICATIONS

Bronzan, Aaron, "LinkedIn Profile Makeovers just got easier: Official LinkedIn Blog", [Online]. Retrieved from the Internet: <URL: http://blog.linkedin.com/2011/08/09/profile-makeover/>, (Aug. 9, 2011), 3 pgs.

(Continued)

*Primary Examiner* — Matt Kim
*Assistant Examiner* — Maryam Ipakchi
(74) *Attorney, Agent, or Firm* — Schwegman Lundberg & Woessner, P.A.

(57) ABSTRACT

According to various exemplary embodiments, it is determined that a particular user is associated with a particular member segment of a networking website. Further, a task prioritization list associated with the particular member segment is accessed. The task prioritization list may include a prioritized list of profile update tasks associated with successful user profile pages of the particular member segment. Moreover, a prompt is displayed inviting the particular user to update the particular user profile page based on the task prioritization list (e.g., by referring to the member segment and at least one of the tasks in the task prioritization list).

20 Claims, 19 Drawing Sheets

(56) References Cited

U.S. PATENT DOCUMENTS

| | | | |
|---|---|---|---|
| 2012/0221477 A1* | 8/2012 | Pande | 705/321 |
| 2012/0233259 A1* | 9/2012 | Work | 709/204 |
| 2012/0310926 A1* | 12/2012 | Gannu et al. | 707/723 |
| 2013/0031090 A1* | 1/2013 | Posse et al. | 707/723 |
| 2014/0143325 A1* | 5/2014 | Lessin et al. | 709/204 |

OTHER PUBLICATIONS

Bronzan, Aaron, "Simple steps to complete LinkedIn Profile: Official LinkedIn Blog", [Online]. Retrieved from the Internet: <URL: http://blog.linkedin.com/2012/02/14/profile-completeness/>, (Feb. 14, 2012), 2 pgs.

* cited by examiner

| Member Segment | Keywords |
|---|---|
| Doctor | doctor, medicine, physician, medical school,... |
| Lawyer | lawyer, law, attorney, esquire, law school,... |
| Sales representative | sale, representative, marketing, advertising, products,... |
| Computer programmer | computers, programmer, engineer, computer science... |

1100 — John  [X]
As a Sales Representative, our data indicates that you should do the following in order to have a successful profile page:

1) Add a photo;
2) Add more connections
3) Add languages
4) Add skills

1130 — Welcome John, let's improve your profile  [X]
When sales representatives include a photo, they receive many more views and career opportunities!

These are your connections who are sales representatives and have already added a photo:
    Alice Smith
    Bob Smith
    Joe Blow
    Joe Shmoe

[ Learn More ]

*Fig. 11b*

Successful Profile Definition

Number of views per [Week ▼] = [200+ ▼]

Number of connections = [300+ ▼]

[Submit]

Fig. 17

GUIDED PROFILE EDITING SYSTEM

TECHNICAL FIELD

The present application relates generally to user profiles and, in one specific example, to a guided profile editing system.

BACKGROUND

Online social and professional networking websites are becoming increasingly popular, with many such websites boasting millions of active users. Each user of the networking website is able to upload an editable user profile page to the networking website. The user profile page may include various information about the user, such as the user's biographical information, photographs of the user, and information describing the user's employment history, education history, skills, experience, activities, and the like. Such user profile pages of the networking website are viewable by, for example, other users of the networking website.

BRIEF DESCRIPTION OF THE DRAWINGS

Some embodiments are illustrated by way of example and not limitation in the figures of the accompanying drawings in which:

FIG. 5 illustrates an example of a data structure containing member segment definition information, according to various embodiments.

FIG. 11a illustrates an example portion of a prompt, according to various embodiments.

FIG. 11b illustrates an example portion of a prompt, according to various embodiments.

FIG. 17 illustrates an example portion of a user interface, according to various embodiments.

DETAILED DESCRIPTION

Example methods and systems for improving user profile pages are described. In the following description, for purposes of explanation, numerous specific details are set forth in order to provide a thorough understanding of example embodiments. It will be evident, however, to one skilled in the art that the present invention may be practiced without these specific details.

Figure 1:
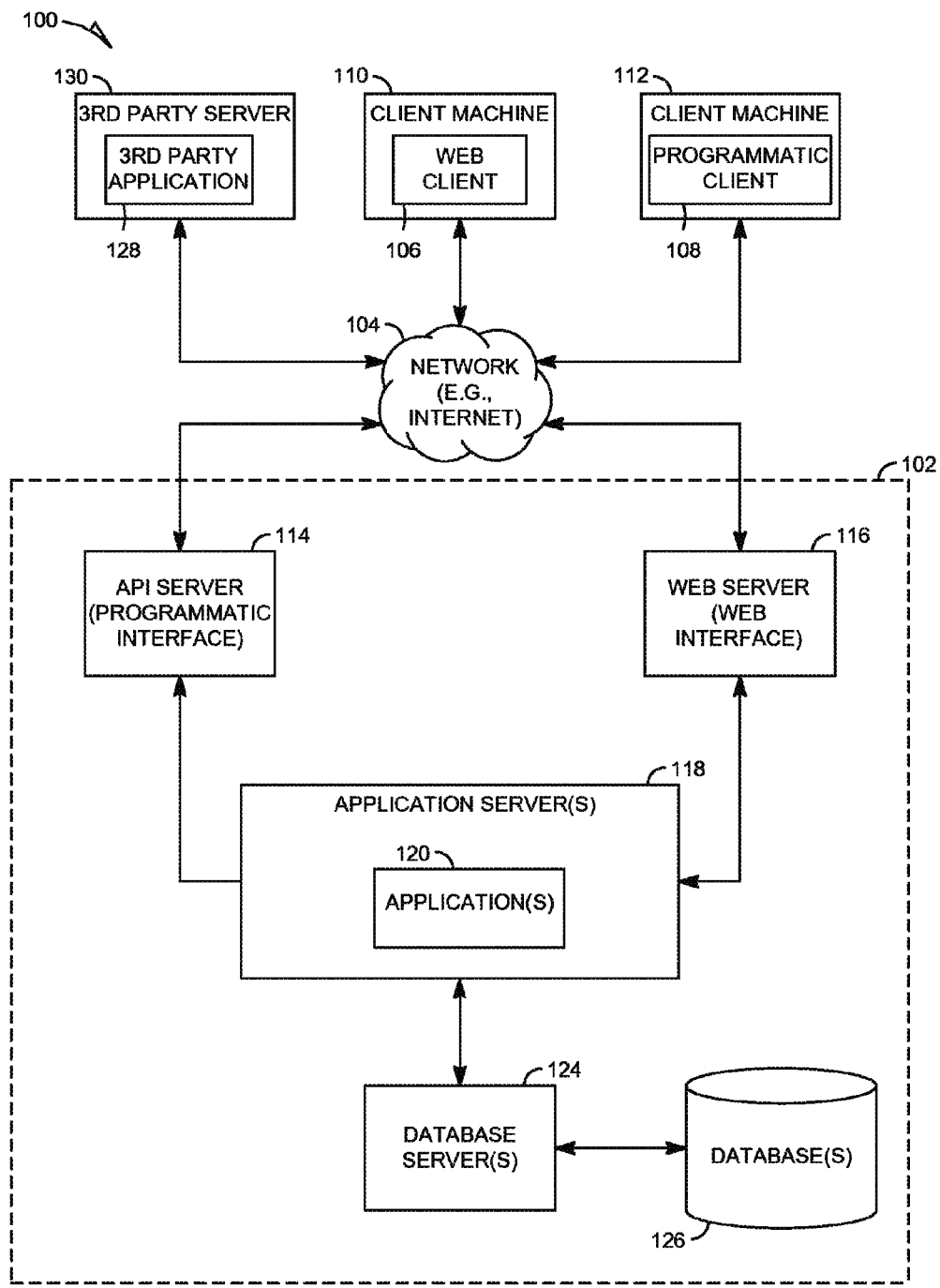
FIG. 1 is a network diagram depicting a client-server system, within which one example embodiment may be deployed.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may correspond to one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
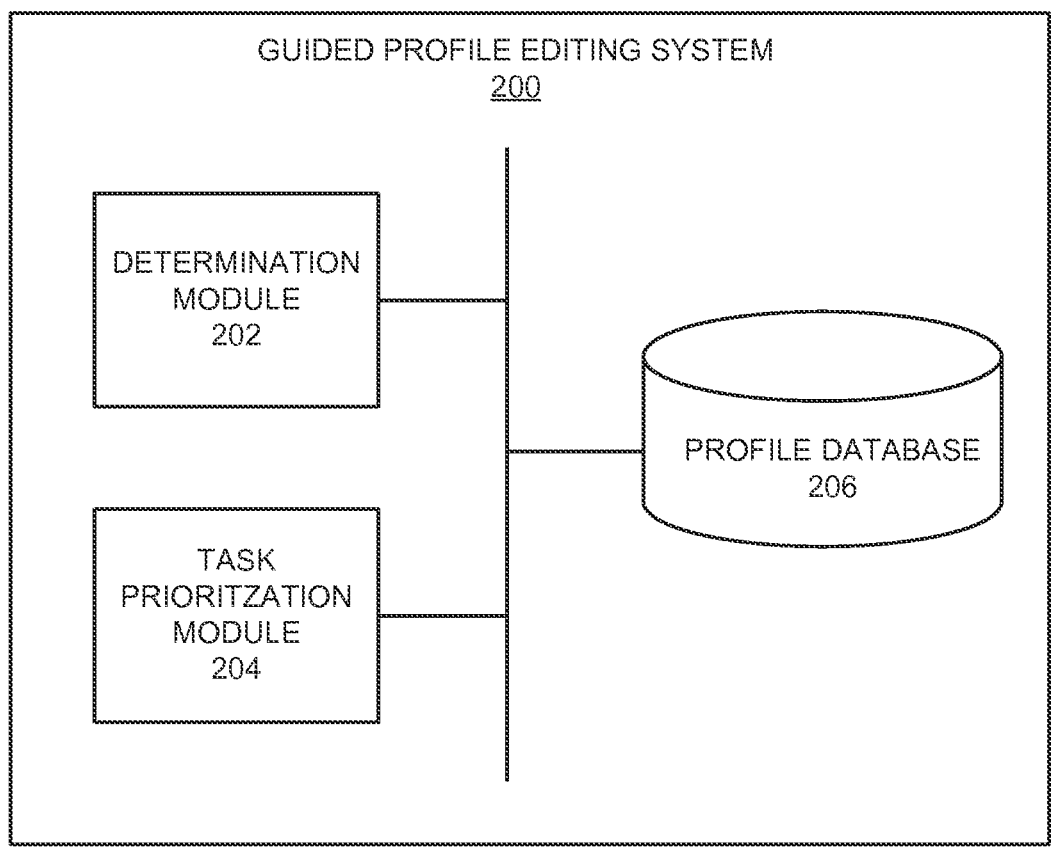
FIG. 2 is a block diagram of an example system, according to various embodiments.

Turning now to FIG. 2, a guided profile editing system 200 includes a determination module 202, a task prioritization module 204, and a profile database 206. The modules of the guided profile editing system 200 may be implemented on a single device such as a guided profile editing device, or on separate devices interconnected via a network. The aforementioned guided profile editing device may correspond to, for example, one of the client machines 110, 112 or application server(s) 118 illustrated in FIG. 1.

The determination module 202 is configured to detect that a user is logged into a social or professional networking website and is viewing their own user profile page on the networking website. For example, online social and professional networking websites may have multiple users or members, where each user of the networking website is able to upload an editable user profile page to the networking website (such as, for example, a LinkedIn® profile of the LinkedIn.com networking website). The user profile page may include various information about the user, such as the user's biographical information, photographs of the user, and information describing the user's employment history, education history, skills, experience, activities, and the like. Such user profile pages of the networking website are then viewable by, for example, other users of the networking website. Thus, the particular user described above may be a user of a social or professional networking website, and may be associated with their own profile page of the networking website that includes information regarding that user.

Figure 3:
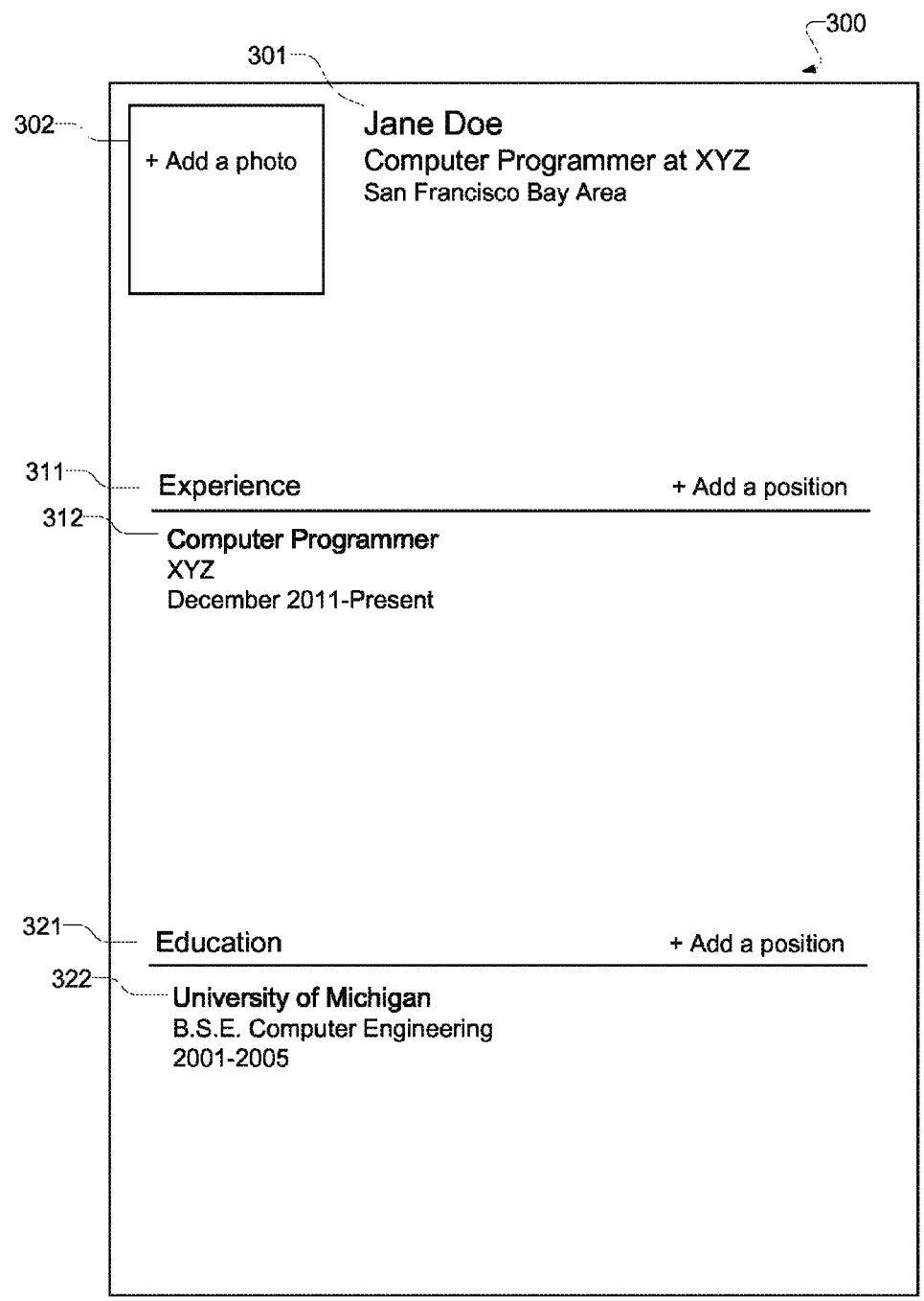
FIG. 3 illustrates an example portion of a user profile page, according to various embodiments.
Figure 4:
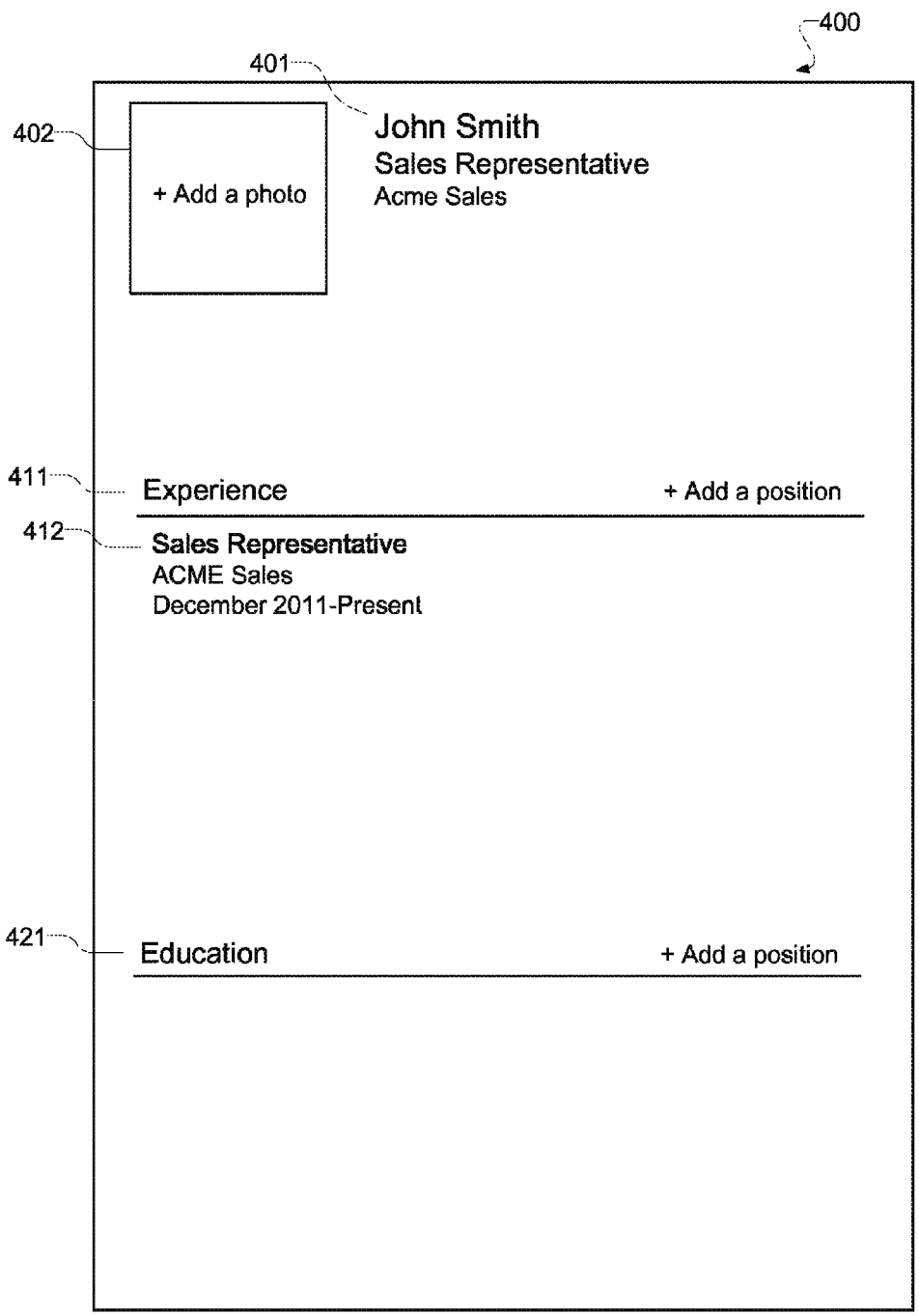
FIG. 4 illustrates an example portion of a user profile page, according to various embodiments.

An example of a user profile page 300 of a user (e.g., a LinkedIn® page of a user "Jane Doe") is illustrated in FIG. 3. As seen in FIG. 3, the user profile page 300 includes identification information 301, such as the user's name ("Jane Doe"), user's current employment position, ("Computer Programmer at XYZ"), and geographic address/location information ("San Francisco Bay Area"). The user's profile page also includes a photo area 302 for displaying a photograph of the user. Further, the user profile page includes various sections (also known as fields). For example, user profile page 300 includes an experience section 311 including listings of experience positions (e.g., employment/volunteer experience position 312) of the user, and an education section 321 including listings of educational credentials of the user (e.g., university degree or diploma 322 earned or currently being earned by the user). Similarly, FIG. 4 illustrates an example of another user profile page 400 of another user (e.g., a LinkedIn® page of a user "John Smith"), including identification information 401, photo area 402 for displaying a photo of the user, an experience section 411 a listing of an experience position 412 of the user, and an education section 421 that may include listings of educational credentials of the user. Note that the user profile pages 300 and 400 are merely exemplary, and while the user profile pages 300 and 400 include certain sections (e.g., experience sections and educations sections), it is apparent that these sections or fields may be supplemented or replaced by other sections or fields (e.g., a general portfolio section/field, an art portfolio section/field, a music portfolio section/field, a photography portfolio section/field, a multimedia section/field, and so forth). Those skilled in the art will understand that a user profile page may include other information, such as various identification information (name, username, email address, geographic address, networks, location, phone number, etc.), education information, employment information, resume information, skills, experience, activities, group membership, images, photos, preferences, news, status, links or URLs on the profile page, and so forth.

The user profile pages of the networking website may correspond to user profile web pages hosted by a remote web server associated with the networking website (e.g., server 118 illustrated in FIG. 1). Such user profile web pages may be accessible through a network (e.g., the Internet) with use of a web browser of a client device that accesses a specific Uniform Resource Locator (URL) reference link corresponding to each user profile web page. For example, when a user of a client device (e.g., client machines 110 or 112 illustrated in FIG. 1) provides the appropriate user commands to a browser application operating on the client device, the browser application transmits a request to the appropriate URL through a network (e.g., the Internet), and the remote web server transmits a response to the browser application of the client device, where the response includes code corresponding to the user profile page (e.g., HTML code, HTML5 code, XHTML code, JavaScript code, etc.). Thereafter, the browser application interprets the received code, and renders the code as a visual webpage that may be displayed by a display unit of the client device (e.g., a display screen or display monitor), on that the user profile web page may be viewed by the user of the client device. Such aspects of a browser application accessing web pages hosted by remote web servers through a network are understood by those skilled in the art, and hence shall not be described in further detail in the interests of brevity.

The determination module 202 may determine that a user (e.g., Jane Doe illustrated in FIG. 3) is viewing or accessing their own user profile page (e.g., user profile page 300 illustrated in FIG. 3), when a client device (e.g., client machines 110 or 112 illustrated in FIG. 1) corresponding to the user accesses the URL corresponding to the user profile page. The determination module 202 may determine that the client device corresponds to the user by, for example, determining that the browser application of that device has previously transmitted user login information (or user authentication information or user identification information) associated with the user to the remote web server, (e.g., when the user enters their user name and password into that particular client device, which provides such information to the networking website hosted by the remote web server in order to login to the networking website).

After the determination module 202 determines that a user is logged into the networking website and/or is viewing their own user profile page, the determination module 202 is configured to determine that the user is associated with a particular member segment of the networking website. As described throughout this disclosure, a particular "member segment" corresponds to a group of users of the networking website, such as a group of users of the networking website that have some characteristic in common. For example, a particular member segment may include all users associated with a particular career track or career path, such as a particular job, occupation, profession, career, industry, job title, field, etc. The member segments may be defined broadly and in general terms (e.g., Artist, Doctor, Engineer, Programmer, etc.), or may be defined in more specific terms by taking into account the occupation of the user, the work positions/rank of the user, the education of the user, the location of the user, the employer of the user, and other factors (e.g., Doctor—Harvard Medical School, Computer Engineer—University of Michigan, Electrical Engineer—San Francisco Bay Area, Consultant—New York, N.Y., etc.). Thus, it should be understood that member segments may be defined broadly and are not limited to the simple examples describe here. Other examples of member segments may include those with users that all have a common location, common education level, common employer, common skills, common interests/hobbies, common race, common gender, common nationality, and so on.

The determination module 202 may determine that a particular user is associated with a particular member segment of the networking website, based on an analysis of information included in the user's profile page, such as an analysis of the user's educational information, work experience information, age, location, skills, activities, resume, industry, various media added to the profile, art portfolio information, music portfolio information, photography portfolio information, multimedia information included in the profile, various keywords in the profile, and so forth.

For example, according to an exemplary embodiment, the determination module 202 may refer to member segment definition information that identifies different member segments of the user base of the networking website, and characteristics or keywords associated with each of the member segments. FIG. 5 illustrates an example of member segment definition information 500 that identifies different member segments (e.g., "Doctor", "Lawyer", "Sales representative", and "Computer programmer"). The member segment definition information 500 also identifies keywords associated with each of the member segments (such as, for example, keywords of "doctor", "medicine", "physician", "medical school", etc., associated with the member segment of "doctor"). Thus, the determination module 202 may perform a textual analysis of the contents of a user profile page of a user, and if the determination module 202 detects keywords corresponding to a specific member segment in the user profile page, then the determination module 202 may associate that user profile page or user with that member segment.

For example, if the determination module 202 performs a textual analysis of the user profile page 300 illustrated in FIG. 3, the determination module 202 may detect the keywords "computer", "programmer", and "engineer" in the user profile page 300. By referring to the member segment definition information 500, the determination module 202 may determine that the detected keywords correspond to the member segment "computer programmer", and thus the determination module 202 may associate the user profile page 300 (or the corresponding user "Jane Doe") with the member segment "computer programmer". As another example, if the determination module 202 performs a textual analysis of the user profile page 400 illustrated in FIG. 4, the determination module 202 may detect the keywords "sales", and "representative" in the user profile page 400. By referring to the member segment definition information 500, the determination module 202 may determine that the detected keywords correspond to the member segment "sales representative", and thus the determination module 202 may associate the user profile page 400 (or the corresponding user "John Smith") with the member segment "sales representative".

The determination module 202 may perform the aforementioned textual analysis by simply detecting keywords throughout the user profile page, or by focusing on detecting keywords at specific positions within the user profile page, such as, for example, the title of an experience listing (e.g., listing 312 in FIG. 3 or listing 412 in FIG. 4), the title of an education listing, and the like. The determination module 202 may perform the textual analysis based on the content of the user profile pages by, for example, analyzing database records in profile database 206 that include user profile data associated with each user or each user profile page. The member segment definition information 500 is merely exemplary, and it is apparent that other member segments and/or other keywords may be included in the member segment definition information 500. The member segment definition information 500 may be generated based on, for example, user input by an operator or administrator of the guided profile editing system 200.

The determination module 202 may also determine that a particular user is associated with a particular member segment, based on an analysis of outside information external to the user's profile page. For example, the determination module 202 may perform a search of the Internet or other network based on identification information of the user (which may be obtained from the user's profile page). Thereafter, any websites or online material received as a result of the search may be analyzed and compared against the member segment definition information 500. Hone or more of the search results includes keywords associated with a given member segment that are identified in the member segment definition information 500, then that user may be associated with the given member segment.

Referring back to FIG. 2, after the determination module 202 determines that a particular user is associated with a particular member segment of the networking platform, the task prioritization module 204 is configured to access a task prioritization list associated with the particular member segment. For example, the task prioritization module 204 may access task prioritization information 600 illustrated in FIG. 6 that lists a number of member segments (e.g., Doctor, Lawyer, Sales representative, Computer programmer, etc.), and a task prioritization list associated with each member segment.

As described throughout, a "task prioritization list" associated with a member segment is a prioritized list of profile update tasks (i.e., tasks for updating a user profile), which are generated based on characteristics of successful user profile pages of each member segment. As described in more detail below, "successful" user profile pages may be user profile pages having a high view count, a high search result visibility ranking, a high number of connections with other users, and so on. Thus, the profile update tasks in a task prioritization list of a member segment are associated with (or indicative of) characteristics of successful user profile pages in that member segment. For example, the task prioritization list for the member segment "Doctor" in FIG. 6 indicates that successful user profile pages of other doctors include various characteristics such a current position, descriptions of positions, and publications. Thus, the task prioritization list for the member segment "Doctor" indicates that, in order to have a successful profile page for a doctor, the user needs to ensure that they have a current position, descriptions for positions, and publications included in the user profile. The manner in which the aforementioned task prioritization lists are generated by the guided profile editing system 200 is described later in this disclosure. While the various task prioritization lists in FIG. 6 take the format of tasks to be performed (such as "(1) Add Current position; (2) Add descriptions for positions", etc.), the task prioritization lists may alternatively take the form of a list of characteristics (such as "(1) Current position; (2) Descriptions for positions", etc.).

Figure 6:
FIG. 6 illustrates an example of a data structure containing task prioritization information, according to various embodiments.

Referring to both FIG. 5 and FIG. 6, it is possible that the determination module 202 may be unable to associate a particular user with one of the specific member segments, such as when the user profile of the user does not include keywords associated with any of the specific member segments (e.g., the keywords associated with the member segments "Doctor", "Lawyer", "Sales representative", and "Computer programmer", as defined in the example member segment definition information 500 illustrated in FIG. 5). In such case, the determination module 202 may associate that particular user or user profile with a "Generic" (or "Default") member segment, if the particular user or user profile cannot be associated with any of the other more specific member segments as described above. According to one embodiment, the Generic member segment may represent the entire user base of the networking website. Alternatively, the Generic member segment may represent only the users of the networking website that are not associated with any of the other, more specific member segments (e.g., "Doctor", "Lawyer", "Sates representative", and "Computer programmer", etc.).

As illustrated in FIG. 6, the Generic member segment includes its own task prioritization list. If the Generic member segment represents the entire user base of the networking website, then the task prioritization list for the Generic member segment may include a prioritized list of profile update tasks associated with all of the successful user profile pages of the entire member base of the networking website. Alternatively, if the Generic member segment represents only the set of users of the networking website that are not associated with any of the other, more specific member segments, then the task prioritization list for the Generic member segment may include a prioritized list of profile update tasks associated with all of the successful user profile pages in this set of users. The manner in which the aforementioned task prioritization list is generated by the guided profile editing system 200 is described later in this disclosure.

After the task prioritization module 204 accesses the task prioritization list associated with the member segment of the user, the task prioritization module 204 displays a prompt that invites the user to update their user profile page, based on the accessed task prioritization list. For example, the task prioritization module 204 may superimpose a prompt over the user's profile page currently being viewed by the user (i.e., being accessed and displayed by the client device associated with the user). The prompt encourages or invites the user to update their profile page, and may refer to the particular member segment of the user, the task prioritization list associated with the particular member segment, or one or more of the tasks included in the task prioritization list.

Figure 7:
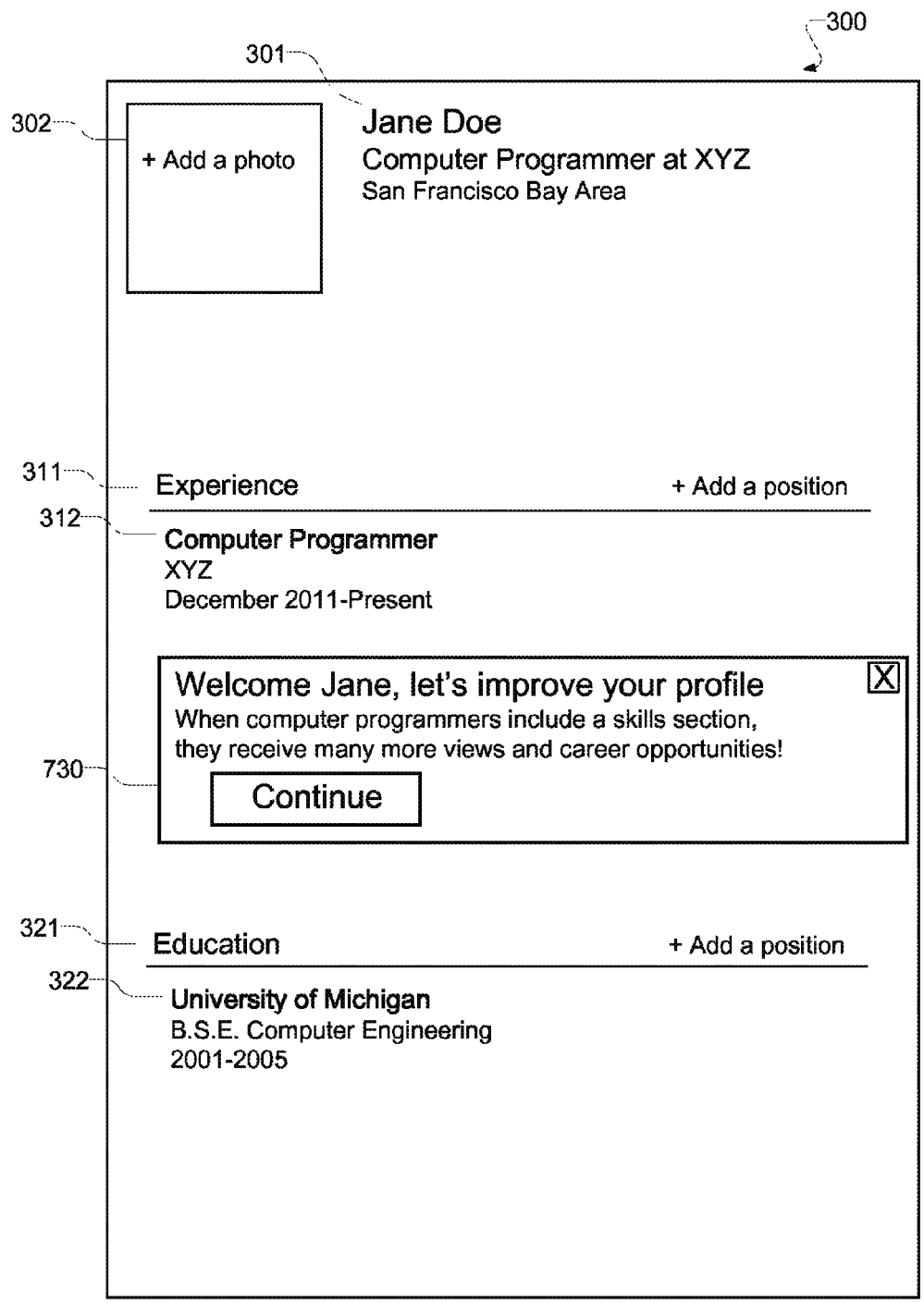
FIG. 7 illustrates an example portion of a user profile page with a prompt superimposed thereon, according to various embodiments.

For example, FIG. 7 illustrates a user profile page 300 which is substantially similar to the user profile page 300 illustrated in FIG. 3. If the user Jane Doe is currently viewing her own user profile page 300, then as illustrated in FIG. 7, the task prioritization module 204 may superimpose the prompt 730 over the user profile page 300. The prompt 730 invites the viewing user Jane Doe to update her profile by referring to the member segment of the particular user and/or at least one or more items in the task prioritization list of that member segment. For example, recall that the determination module 202 determined that the user Jane Doe is associated with the "Computer Programmer" member segment, and the task prioritization module 204 accessed the task prioritization list associated with this member segment (see FIG. 6). Accordingly, the prompt 730 generated by the task prioritization module 204 refers to "computer programmers", and refers to at least one of the tasks in the task prioritization list for computer programmers (e.g., the "Add Skills" task). Thus, the prompt 730 invites the user Jane Doe to add a skills section to her profile page.

The prompt 730 is designed to encourage the user to update their profile by, for example, identifying an advantage associated with updating their profile (such as an advantage of receiving more profile views, more career opportunities, more connections, appearing higher in search results, and the like), and by implying that this advantage is some way tied to their particular member segment (e.g., their career path). This may increase the prompt's effectiveness by making the prompt appear more personalized and relevant to the particular user, since it identifies the user's job, for example, and a specific advantage that updating their profile may have on their job.

Figure 8:
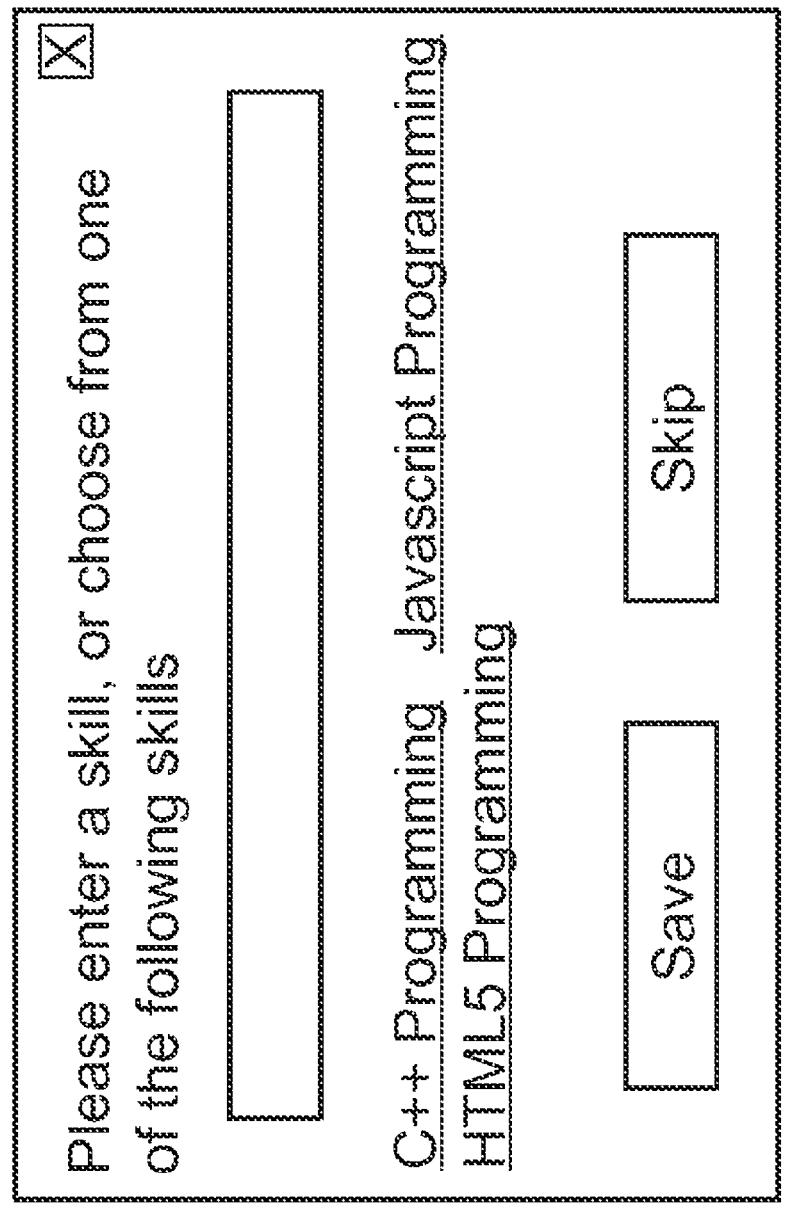
FIG. 8 illustrates an example portion of a user interface, according to various embodiments.
Figure 9:
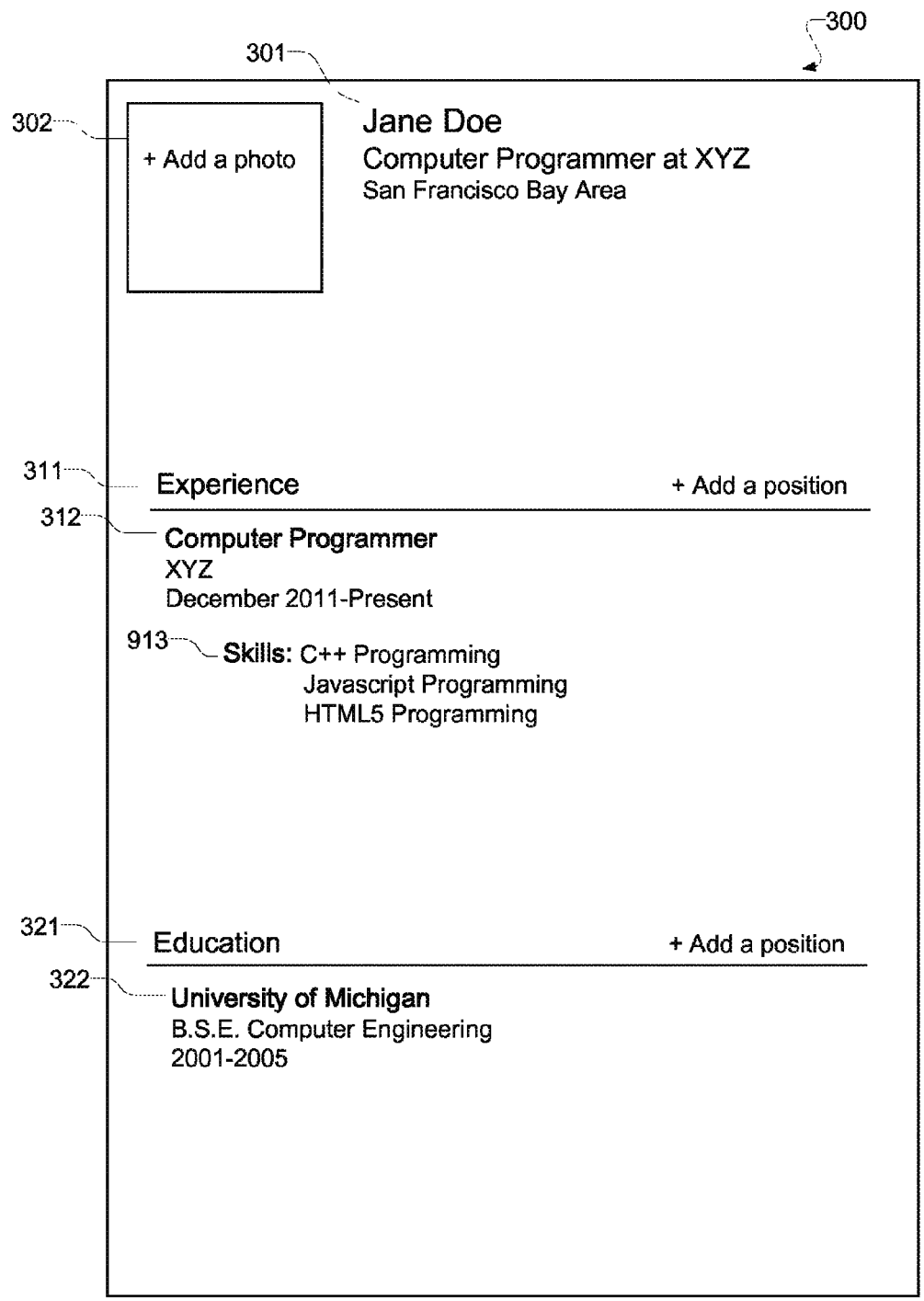
FIG. 9 illustrates an example portion of a user profile page, according to various embodiments.

If the user decides to proceed with updating their user profile, the user may click on a button within the prompt (e.g., "Continue" in FIG. 7) that includes a reference link to a profile edit webpage/wizard, and the user will be presented with the profile edit webpage/wizard that will allow the user to edit their own profile page (and may include specific instructions or suggestions regarding how the user can update their own profile page based on the task prioritization list). For example, if the user Jane Doe selects the "Continue" button in the prompt 730 in FIG. 7, the user is presented with the window 800 in FIG. 8 that permits the user Jane Doe to add "skills" to her profile, either by entering skills or choosing from skills determined to be popular with the other users/user profile pages in that member segment. As a result, the profile page 300 of the user is updated to show the added skills. For example, FIG. 9 illustrates a user profile page 300 which is substantially similar to the user profile page 300 illustrated in FIG. 3, where the user profile page 300 in FIG. 9 now also includes a skill section 913.

Figure 10:
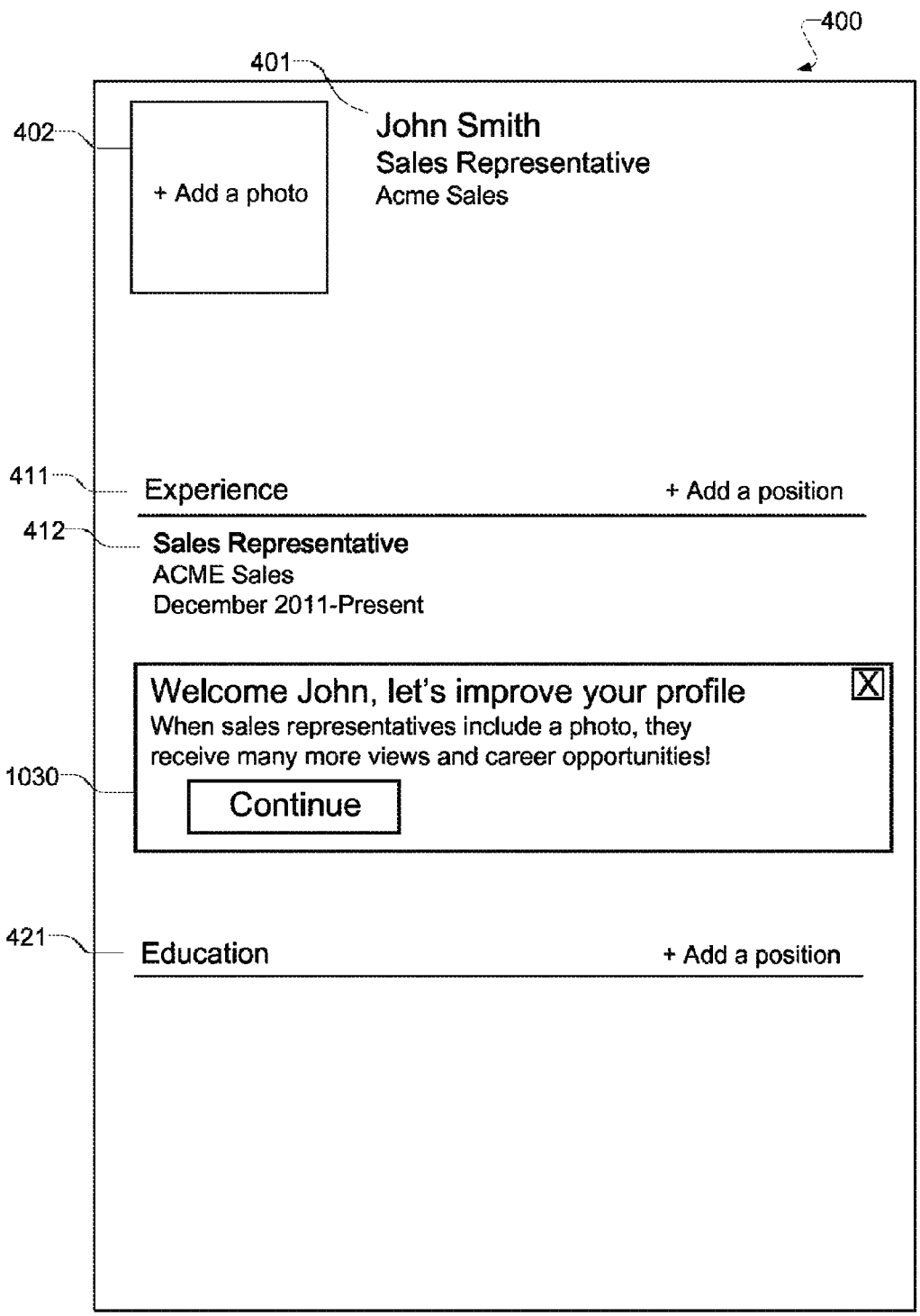
FIG. 10 illustrates an example portion of a user profile page with a prompt superimposed thereon, according to various embodiments.

As another example, FIG. 10 illustrates a user profile page 400 which is substantially similar to the user profile page 400 illustrated in FIG. 4. If the user John Smith is currently viewing his own user profile page 400, then as illustrated in FIG. 10, the task prioritization module 204 may superimpose the prompt 1030 over the user profile page 400. The prompt 1030 invites the viewing user John Smith to update his profile by referring to the member segment of the particular user and/or at least one aspect described in the task prioritization list of that member segment. For example, recall that the determination module 202 determined that the user John Smith is associated with the "Sales Representative" member segment, and the task prioritization module 204 accessed the task prioritization list associated with this member segment (see FIG. 6). Accordingly, the prompt 1030 generated by the task prioritization module 204 refers to "sales representatives", and refers to at least one of the tasks in the task prioritization list for sales representatives (e.g., the "Add Photo" item). Thus, the prompt 1030 invites the user John Smith to add a photo to his profile page. The prompt 1030, like the prompt 730, is designed to encourage the user to update their profile by, for example, identifying an advantage associated with updating their profile (such as an advantage of receiving more profile views, more career opportunities, more connections, appearing higher in search results, and the like) and by implying that this advantage is some way tied to their particular member segment (e.g., their career path). Note that the prompts displayed by the task prioritization module 204 may alternatively reproduce the entire task prioritization list for the member segment of the user. For example, FIG. 11a illustrates another example of a prompt 1100 that may be displayed over the user profile page 400, where the prompt 1100 essentially reproduces the entire task prioritization list for the member segment of the user (i.e., the member segment "sales representative", see FIG. 6).

According to an exemplary embodiment, the prompt displayed to a particular user may identify other users on the networking website with some relationship to the particular user (e.g., friends or connections of the particular user) that have already completed a particular profile update task. Thus, the particular user is further incentivized to complete the particular profile update task. For example, FIG. 11b illustrates another example of a prompt 1130 that is similar to the prompt 1030 illustrated in FIG. 10, where the prompt 1130 further informs the particular user John Smith of his connections that have already completed the particular profile update task "Add a photo". (The determination module 202 may determine which users have completed the particular profile update task, based on user task history information included in various user records of users, as described in various embodiments below in connection with FIG. 13.) While the prompt 1130 identifies connections that are also associated with the same member segment as the particular user John Smith (i.e. the member segment "Sales Representative"), the prompt 1130 may identify connections that are not associated with the same member segment as the particular user.

Figure 12:
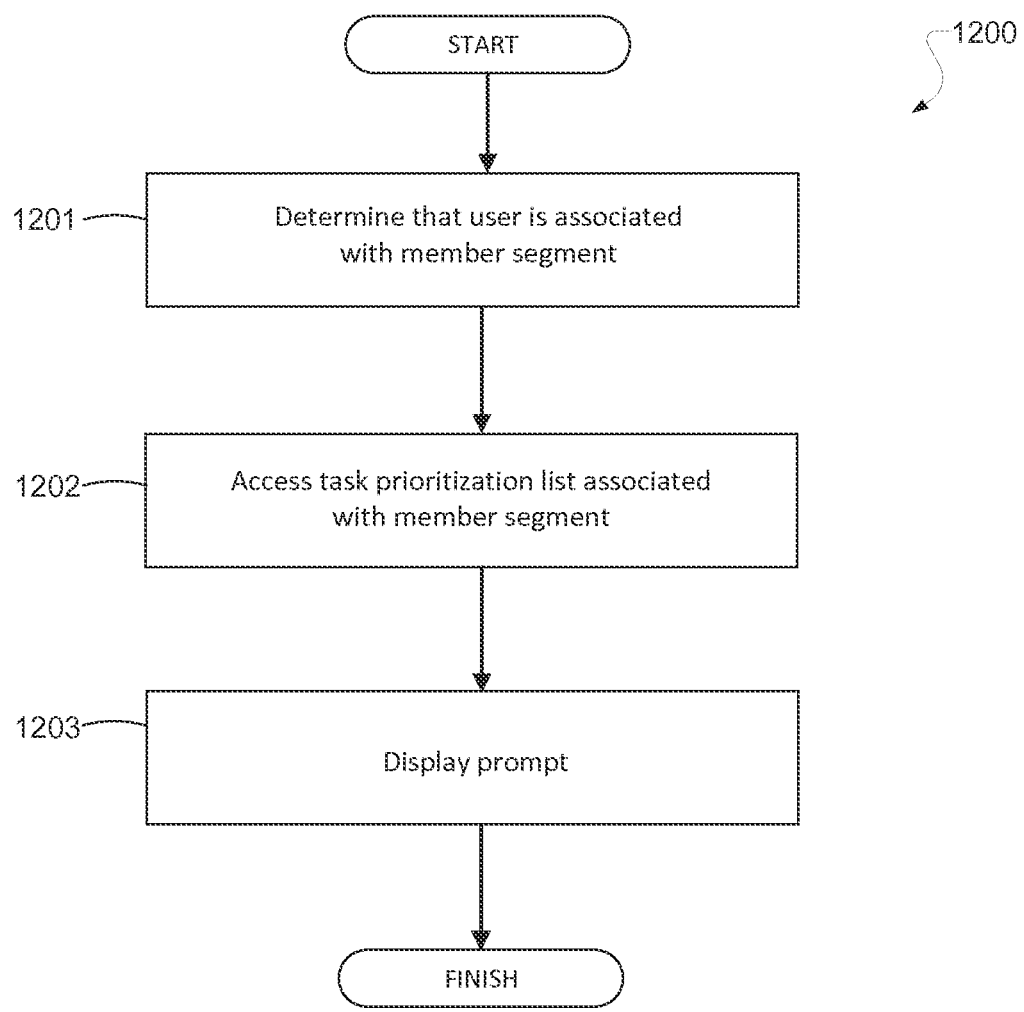
FIG. 12 is a flowchart illustrating an example method, according to various embodiments.

FIG. 12 is a flowchart illustrating an example method 1200, according to various embodiments. The method 1200 may be performed at least in part by, for example, the guided profile editing system 200 illustrated in FIG. 2 (or an apparatus having similar modules, such as client machines 110 and 112 or application server 112 illustrated in FIG. 1). In 1201, the determination module 202 determines that a particular user is associated with a particular member segment of a networking website. In 202, the task prioritization module 204 accesses a task prioritization list associated with the particular member segment determined in 1201. The task prioritization list includes a prioritized list of profile update tasks associated with successful user profile pages of the particular member segment. In 1203, the task prioritization module 204 displays a prompt that invites the particular user to update the particular user profile page, based on the task prioritization list accessed in 1202.

Thus, according to the aspects of this disclosure, when a user logs into a networking website and views their user profile page, the user is presented with one or more options for updating their profile page, where the options are customized for the user based on, for example, the career track of the user. Thus, the aspects of this disclosure may be applied by social and professional networking websites to promote profile completeness among users of the websites.

Figure 13:
FIG. 13 illustrates an exemplary user record, according to various embodiments.

According to various exemplary embodiments, the guided profile editing system 200 may maintain user records for each of the users of the networking website. For example, FIG. 13 illustrates an exemplary data table or similar data structure that includes a user record 1300 for the user Jane Doe. The user record 1300 includes: identification information identifying the user (e.g., user name "Jane Doe"); a pointer or reference link for accessing the user profile page of the user (e.g., the uniform resource locator or URL for accessing the user profile page 300 illustrated in FIG. 3); the member segment of the user (as determined by the determination module 202, as described above), and the task prioritization list corresponding to the member segment (as determined by the task prioritization module 204, as described above). That is, after the determination module 202 determines that the user is associated with a particular member segment, the determination module 202 may modify the user record 1300 of the user to reflect the determined member segment, as illustrated in FIG. 13. Similarly, after the task prioritization module 204 accesses a task prioritization list associated with the particular member segment, the task prioritization module 204 may modify the user record 1300 to reflect the accessed task prioritization list, as illustrated in FIG. 13.

According to various exemplary embodiments, the user record 1300 may be generated by the determination module 202 and the task prioritization module 204 ahead of time, such as before the method 1200 is performed. For example, the user record 1300 may be generated while users are off-line and/or before a user utilizes the client device to view the profile page of the user. Further, the user records may be updated by the guided profile editing system 200 at regular time intervals, even if the various users of the networking website are off-line. The determination module 202 may generate the user records by, for example, analyzing the user profile pages (or database records in profile database 200c containing profile data associated with each user profile page), as described above.

Accordingly, it is possible that in operation 1201 in FIG. 12, the determination module 202 may determine that a particular user is associated with a particular member segment of the networking website, by simply accessing the pre-existing user record of the user (e.g., user record 1300 illustrated in FIG. 13). Similarly, it is possible that in operation 1202 in FIG. 12, the task prioritization module 204 may access a task prioritization list associated with the user's member segment, by simply accessing the pre-existing user records of the user (e.g., user record 1300 illustrated in FIG. 13). Thus, when the system 200 determines that a particular user is online and is viewing their own profile page, the system 200 may access the user record 1300 for the particular user, to identify the member segment of the user (1201 in FIG. 12) and the task prioritization list associated with the user's member segment (1202 in FIG. 12).

Referring back to FIG. 8, after the user Jane Doe completes the profile update task of adding skills by selecting the "Save" button in the user interface 800, the user may be prompted to update her profile based on other tasks in the task prioritization list. For example, the task prioritization module 204 may display another prompt similar to prompt 730 or 800 that relates to another task in the task prioritization list. If the user Jane Doe selects the "Skip" button in the user interface 800, the user may similarly be prompted to update her profile based on other tasks in the task prioritization list. On the other hand, if the user selects the close button "X" in the user interface 800, then any prompts related to profile updates may be closed during the current login session, and the user will be returned to a view of their user profile page (e.g., see FIG. 9). Thereafter, the next time the task prioritization module 204 displays a prompt may be, for example, the next time the user logs in to the networking website and/or views their user profile page during a subsequent log in session.

Figure 14:
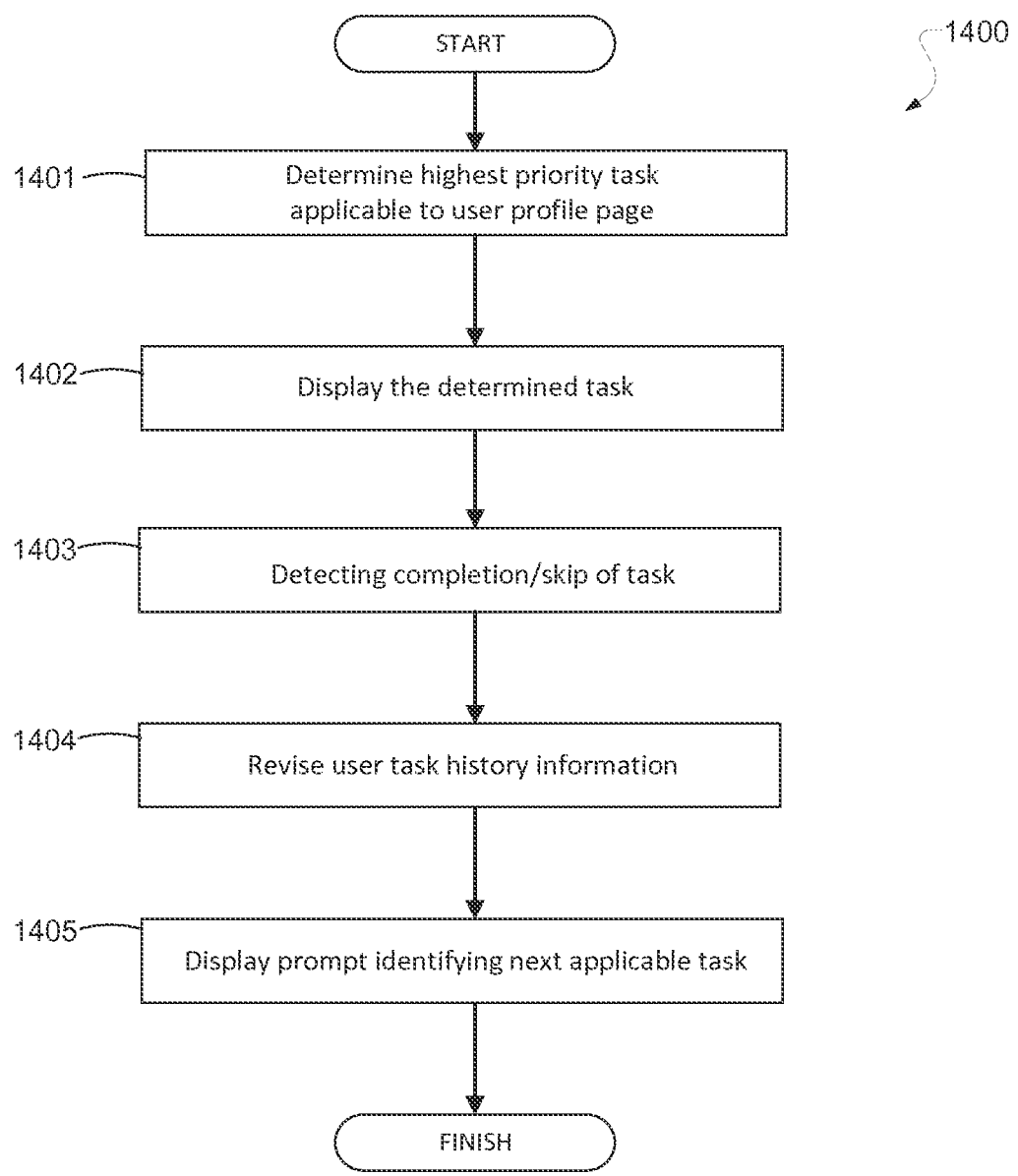
FIG. 14 is a flowchart illustrating an example method, according to various embodiments.
Figure 15:
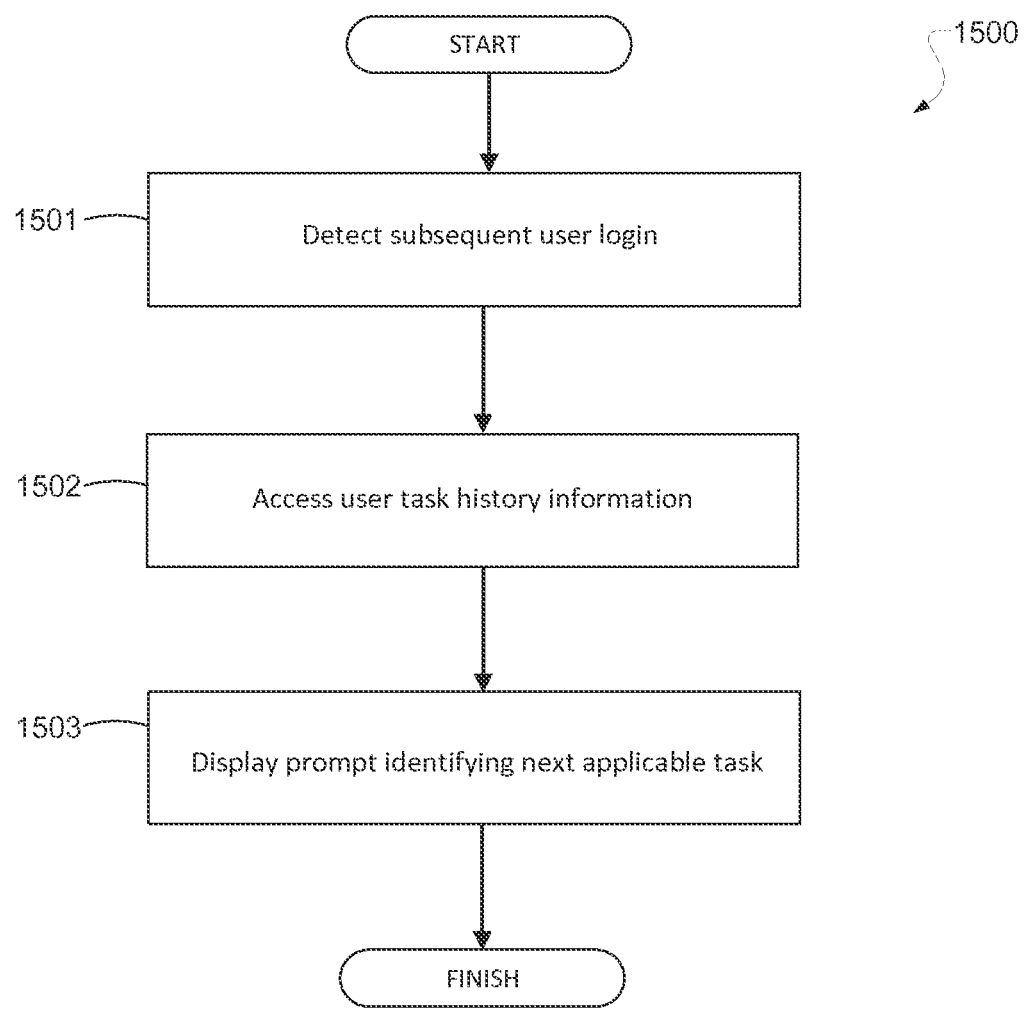
FIG. 15 is a flowchart illustrating an example method, according to various embodiments.

The choice of which profile update task from the task prioritization list should be included in the prompt at any given time is now described in conjunction with FIGS. 13-15. For example, according to an exemplary embodiment, the prompt displayed by the task prioritization module 204 may indicate the highest priority task in the task prioritization list that is applicable to the particular user profile page.

More specifically, the ordering of the tasks in each task prioritization list is controlled by the task prioritization module 204 and indicates a priority of each of the profile update tasks, such that the first task in the task prioritization list is the highest priority task, while the last task in the task prioritization list is the lowest priority task. For example, with reference to FIG. 6, the ordering for the task prioritization list for the member segment "Doctor" indicates that the highest priority task is "(1) Add current position", while the second highest priority task is "(2) Add descriptions for positions", and so forth.

According to an exemplary embodiment, the ordering may indicate the relative "importance" of each of the tasks for improving the success of the user's profile page, such that the highest priority task corresponds to the most important task and the lowest priority task corresponds to the least important task. For example, the ordering may indicate that, of the successful user profile pages in the member segment of "Doctor", the most common or important characteristic is a current position, the second most common or important characteristic is descriptions for positions, and so on. Thus, the highest-priority task in the task prioritization list is "Add a current position", while the second highest priority task is "Add descriptions for positions".

According to another exemplary embodiment described herein, the ordering of the tasks in a task prioritization list may reflect a "highest likelihood of task completion" and/or "ease of task completion" for each of the tasks in the task prioritization list, based on data analysis and/or predictive modelling for the particular user. For example, with reference to FIG. 6, the task prioritization list for the member segment "Computer Programmer" indicates the following ordering: (1) Add current position, (2) Add skills, (3) Add patents, (4) Add degree and major. As described above, this original ordering may indicate the relative "importance" of each of the tasks for improving the success of the user's profile page. However, it is possible that the tasks of "Add current position" and "Add degree and major" may be relatively easy to complete, whereas the tasks of "Add skills" or "Add patents" may be more difficult or time-consuming to complete. Thus, the task prioritization module 204 may calculate an "ease of task completion" score for each of the tasks, and modify the ordering of the tasks in the task prioritization list based on the "ease of task completion" scores, such that the first task (i.e., highest priority task) in the task prioritization list now corresponds to the task that is easiest to complete, while the last task (i.e., lowest priority task) the task prioritization list now corresponds to the task that is the least easiest to complete. Thus, using the example of FIG. 6, the ordering for the task prioritization list for the member segment "Computer Programmer" may be adjusted by the task prioritization module 204 to indicate the example ordering: (1) Add current position, (2) Add degree and major, (3) Add patents, (4) Add skills.

The "ease of task completion" score for each task may be determined by the task prioritization module 204 in various ways. For example, the "ease of task completion" scores may be determined based on user input by an administrator of the system 200. As another example, the "ease of task" completion scores may be determined based on completion rate/time of the given task by users that are similar to the particular user in question (e.g., similarity based on career segment and/or similarity based on the totality of fields currently completed in a profile).

For example, when a prompt is being displayed to a particular user associated with the particular member segment, the task prioritization module 204 may access the task prioritization list for the particular member segment. The task prioritization module 204 may then analyze a sample group of users (e.g., sample users in the same member segment as the particular user and/or sample users that have completed the same/similar profile update tasks as those already completed by the particular user). The task prioritization module 204 may generate the "ease of task completion" scores by analyzing the average completion time for the sample group of users to complete each task in the relevant task prioritization list. This completion time may be measured from when users first created their profile, or when users were first invited to perform the task, or when users began the process of completing the task (such as by pressing the "Continue" button in a profile update prompt, see FIG. 7), and so forth. As another example, the task prioritization module 204 may generate the "ease of task completion" scores by analyzing the task completion rates or average task completion order among the sample group of users, for the tasks in the relevant task prioritization list.

According to another exemplary embodiment, the ordering of tasks in the task prioritization list may be modified by the task prioritization module 204 based a combination of the two aforementioned factors of (a) the relevant "importance" of each task in generating a successful profile and (b) the "ease of task completion" score for each task. For example, the ordering may be modified based on a weighted product of (a) and (b), where the weighting may be specified by user of the system 200. For example, suppose the weighting of the relevant "importance' of the task is greater than the weighting of the "ease of task completion" score. If so, then a task having importance #2 and "ease of task completion" score #1 may possibly replace a task having importance #1 and "ease of task completion" score #20 as the highest priority task at the top of the task prioritization list. On the other hand, a task having importance #20 and "ease of task completion" score #1 will likely not replace a task having importance #1 and "ease of task completion" score #20 (so the order is actually a weighted product of task importance and ease of task completion).

According to an exemplary embodiment, the prompt displayed by the task prioritization module 204 may indicate the highest priority task in the task prioritization list that is applicable to the particular user profile page. That is, the highest priority task applicable to the user profile page will be the highest priority task in the task prioritization list that has not already been completed by the user.

The task prioritization module 204 may determine tasks that have already been completed by the user in various ways. For example, the task prioritization module 204 may determine that the user has completed a task by simply analyzing the current state of the user's profile page (e.g., by analyzing database records in profile database 206 that include user profile data associated with each user or each user profile page). For example, if the task is "Add a photo" or "Add a current position", then the task prioritization module 204 may simply examine the profile page or associated user profile data to determine if the profile page includes a photo or current position, which indicates that these tasks have been completed by the user. Alternatively, the task prioritization module 204 may maintain user task history information tracking profile update tasks that have been performed by the user (e.g., tracking when the user selects the "Save" button of a prompt such as the prompt 800 illustrated in FIG. 8). For example, the user record 1300 for the user Jane Doe illustrated in FIG. 13 includes user task history information tracking tasks that have been performed by the user. It can be seen in FIG. 13 that the user Jane Doe has already performed the tasks of "Add current position", "Add skills", and "Add degree and major".

Thus, according to an exemplary embodiment, the task prioritization module 204 may determine a highest priority task that is currently applicable to the user's profile page, by comparing the task prioritization list of the user's member segment with the tasks that have already been completed by the user. For example, if the task prioritization module 204 accesses the user record 1300 of the user Jane Doe (see FIG. 13), the task prioritization module 204 may compare the prioritization list therein with the user task history information therein. In the example of FIG. 13, since profile update tasks (1), (2) and (4) have already been performed, per the user task history information, the task "(3) Add degree and major" is currently the highest priority task in the task prioritization list that is applicable to the user profile page of the user Jane Doe. Thus, prompts displayed by the task prioritization module 204 will identify the highest priority task in the task prioritization list that is applicable to a user profile page at that time.

In this way, when the prompt is first displayed by the task prioritization module 204, the prompt may identify the highest priority task in the task prioritization list. After the user completes this task and updates their profile, then the next time the prompt is displayed, the prompt will include the next highest priority task in the task prioritization list. This may continue until the user completes all of the tasks in the task prioritization list of the user's member segment.

FIG. 14 is a flowchart illustrating an example method 1400, according to various embodiments. The method 1400 may be performed at least in part by, for example, the guided profile editing system 200 illustrated in FIG. 2 (or an apparatus having similar modules, such as client machines 110 and 112 or application server 112 illustrated in FIG. 1). The method 1400 may replace the operation 1203 illustrated in FIG. 12. In 1401, the task prioritization module 204 determines a highest priority task in the task prioritization list that is applicable to a particular user profile page. (Alternatively, according to another exemplary embodiment, the task prioritization module 204 selects a random task from the task prioritization list). In 1402, the task prioritization module 204 displays the task determined in 1401 in a prompt that is superimposed over the particular user profile page. In 1403, the task prioritization module 204 determines that the particular user has completed or skipped the task in the task prioritization list that was displayed in the prompt in 1402. For example, the task prioritization module 204 may detect a user action corresponding to selecting a "Save" button or "Skip" button in a prompt such as the prompt 800 illustrated in FIG. 8.

In 1404, the task prioritization module 204 revises user task history information associated with the particular user based on the user action detected in 1403. For example, if the user completed the task (e.g., by selecting the "Save" button in a prompt such as the prompt 800 illustrated in FIG. 8), then the user task history information may reflect that the user has completed the task. On the other hand, if the user skipped the task (e.g., by selecting the "Skip" button in a prompt such as the prompt 800 illustrated in FIG. 8), then the user task history information may reflect that the user has not completed the task and/or that the task has been skipped during the current login session only. In 1405, the task prioritization module 204 determines the next highest priority task in the task prioritization list that is applicable to the particular user profile page, based on the user task history information revised in 1404. That is, the task prioritization module 204 will determine the next highest priority task in the task prioritization list that has not been completed by the user or has not been skipped by the user during the current login session. (Alternatively, according to another exemplary embodiment, the task prioritization module 204 selects a random task from the task prioritization list that has not been completed by the user or has not been skipped by the user during the current login session). The task prioritization module 204 displays a prompt identifying this next applicable task.

FIG. 15 is a flowchart illustrating an example method 1500, according to various embodiments. The method 1500 may be performed at least in part by, for example, the guided profile editing system 200 illustrated in FIG. 2 (or an apparatus having similar modules, such as client machines 110 and 112 or application server 112 illustrated in FIG. 1). In 1501, the determination module 202 detects subsequent user login to the networking website (e.g., after the user logs out of the networking website during or after method 1200 or method 1400). In 1502, the determination module 202 accesses the user task history information associated with the particular user (e.g., the user task history information revised in 1404 in FIG. 14). In 1503, the task prioritization module 204 determines the next highest priority task in the task prioritization list that is applicable to the particular user profile page, based on the user task history information accessed in 1502. That is, the task prioritization module 204 will determine the next highest priority task in the task prioritization list that has not been completed by the user. (Alternatively, according to another exemplary embodiment, the task prioritization module 204 selects a random task from the task prioritization list that has not been completed by the user). The task prioritization module 204 displays a prompt identifying this next applicable task.

Figure 16:
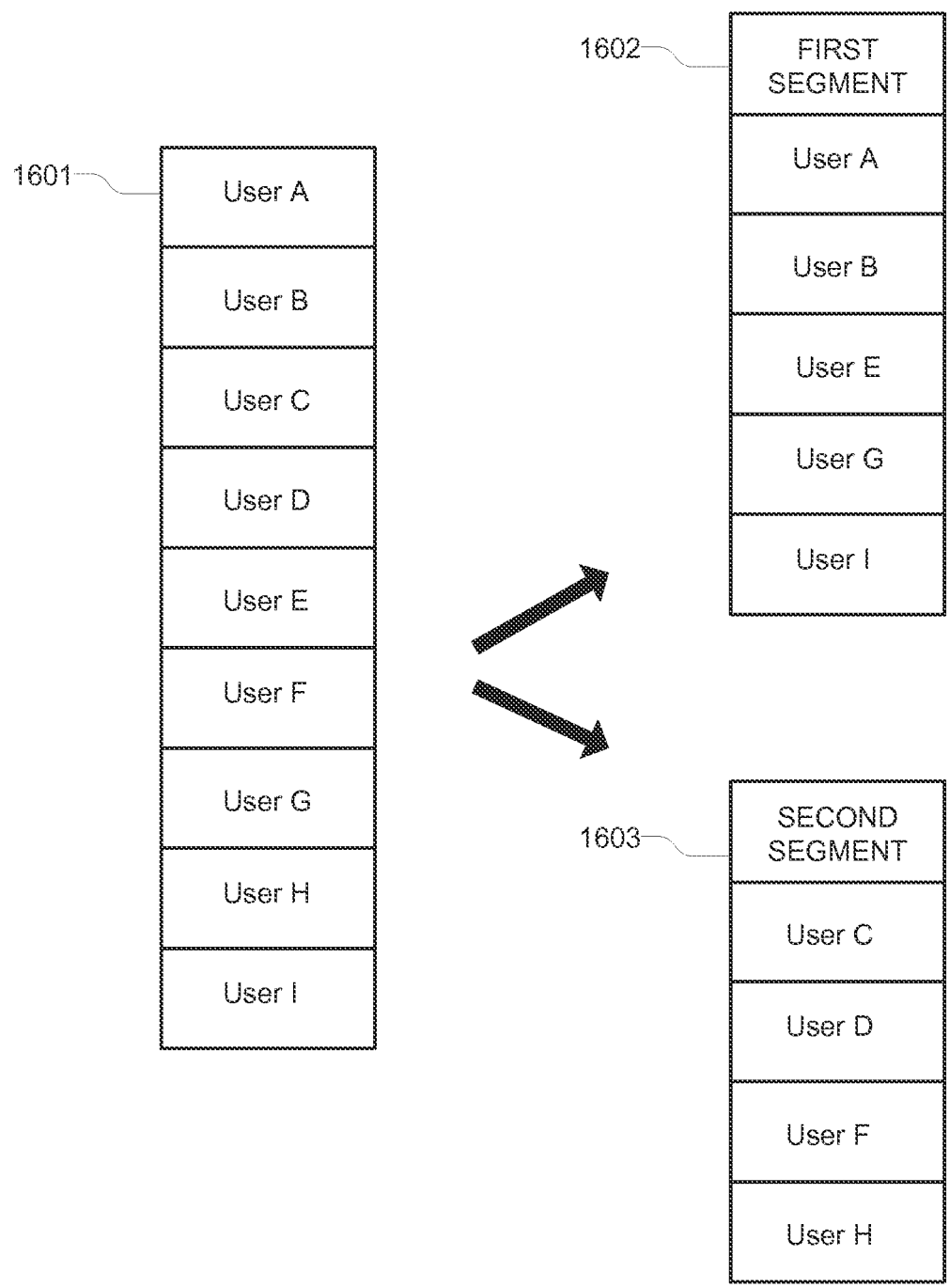
FIG. 16 depicts a user base, a first segment of the user base, and a second segment of the user base.
Figure 18:
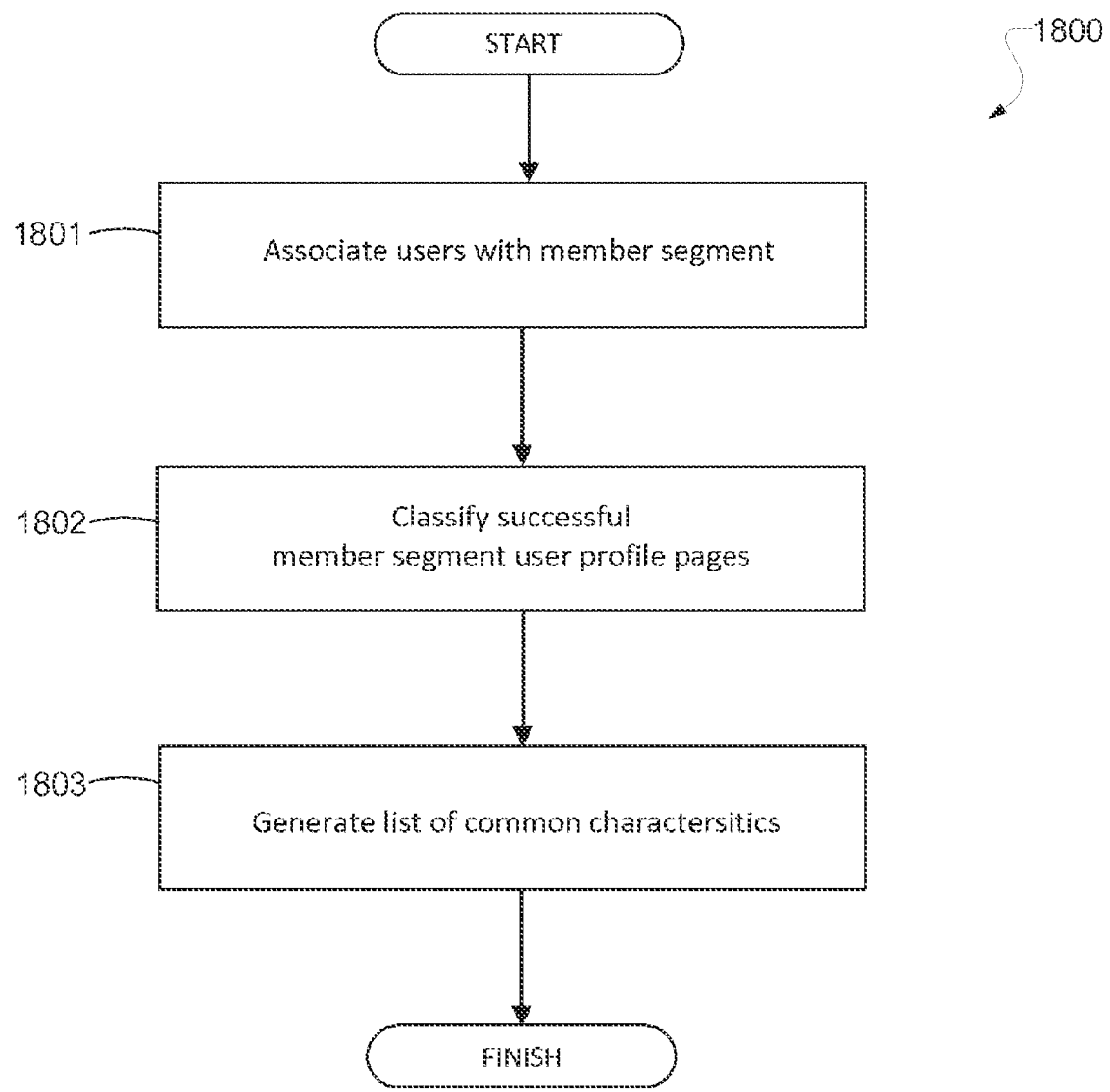
FIG. 18 is a flowchart illustrating an example method, according to various embodiments.

The generation of the various task prioritization list associated with each of the member segments will now described in conjunction with FIGS. 16-18, in particular, the task prioritization list of each member segment is generated based on analytics of successful user profile pages associated with each member segment.

In order to generate the task prioritization list, the determination module 202 first associates each user in the member base of the networking website with a particular member segment (e.g., a specific career track). For example, the list 1601 in FIG. 16 may represent a list of all the users (i.e., the user base) of a networking website. The determination module 202 is configured to segment the user base of the networking website into different member segments, based on the content of the user profile pages associated with the users. For example, according to embodiments described above, the determination module 202 may analyze the user profile pages of all the users in order to associate each of the users with a particular career track (e.g., by checking if an experience listing or an education listing included in a user profile page includes keywords specified in the member segment definition information 500 illustrated in FIG. 5). As illustrated in FIG. 16, the user base 1601 of the networking website may be segmented into a first subset of users 1602 in a first member segment (e.g., a first career track) and a second subset of users 1603 in a second member segment (e.g., a second career track). This segmentation of the user base may be recorded in a collection of user records, where each user record identifies the member segment of each user (e.g., user record 1300 illustrated in FIG. 13). While FIG. 16 illustrates the user base 1601 being segmented into two user segments 1602 and 1603, it is understood that the user base may of course be segmented into more than two segments.

Thereafter, the task prioritization module 204 examines each of the user profile pages of users in a given member segment (e.g., the member segment of Doctor), and classifies a subset of these user profile pages as successful member segment user profile pages. For example, the guided profile editing system 200 may display a user interface allowing the user to specify criteria of successful member segment user profile pages, such as user interface 1700 illustrated in FIG. 17. The aforementioned criteria may specify a view count, a search result visibility ranking, a number of connections, etc., associated with each successful member segment profile page. Thus, the task prioritization module 204 utilizes the aforementioned criteria to determine all the profiles in the each member segment that are successful profile pages.

Finally, the task prioritization module 204 analyzes each of the successful profile pages in a given member segment, and determines a list of common characteristics of these successful profile pages. For example, in the member segment of "Doctor", the most common characteristic may be that the successful profile pages includes a current position, while the second most common characteristic may be that the successful profile pages include descriptions of positions, while the third most common characteristic may be that the successful user profile pages include descriptions of publications, and so forth. The task prioritization module 204 then generates the task prioritization list for the member segment of "Doctor" based on these common characteristics, where the ordering of the list tracks how common each characteristic is. It is also possible that the task prioritization module 204 may compare the successful profile pages of the member segment with the non-successful profile pages of the same member segment, in order to detect the characteristics that are common to the former but are not common in the latter. The task prioritization module 204 may also analyze the common characteristics of the successful member segment profile pages to generate suggestions for display in various profile edit pages/wizards, (e.g., the suggested skills illustrated in FIG. 8).

FIG. 18 is a flowchart illustrating an example method 1800, according to various embodiments. The method 1800 may be performed at least in part by, for example, the guided profile editing system 200 illustrated in FIG. 2 (or an apparatus having similar modules, such as client machines 110 and 112 or application server 112 illustrated in FIG. 1). In 1801, the determination module 202 associates a plurality of users with a particular member segment, based on content of user profile pages associated with the plurality of users. For example, a respective user may be associated with a particular member segment, based on an experience listing and or an education listing included in the user profile page of the respective user. In 1802, the task prioritization module 204 classifies a subset of the plurality of the user profile pages as successful member segment user profile pages. For example, the subset of the plurality of the user profile pages may be classified as the successful member segment user profile pages, based on: a view count associated with each user profile page in the subset; a search result visibility ranking associated with each user profile page in the subset; and a number of connections associated with each user profile page in the subset. In 1803, the task prioritization module 204 generates a list of common characteristics of the successful member segment user profile pages classified in 1802, in order to generate a task prioritization list associated with the particular member segment.

As described above, a "member segment" may correspond to any group of users, such as a group of users of a networking website that have some characteristic in common (e.g., career track or career path). According to an embodiment, an example member segment may actually correspond to the entire set of all the members of the networking website (i.e., the entire member base of the networking website). For example, such a member segment may correspond to the "Generic" member segment described above in connection with FIG. 6. Accordingly, the various methods and embodiments described throughout may be applied to a member segment that corresponds to the entire member base of a networking website, just as they may be applied to a member segment that corresponds to users on a particular career track.

For example, with reference to the method 1200 illustrated in FIG. 12, in 1201 the determination module 202 may determine that a user is associated with the member base of the networking website (i.e., is a member of the networking website) and is viewing their user profile page. Thereafter, in 1202 the task prioritization module 204 may access a task prioritization list associated with the entire member base of the networking website. Such a task prioritization list may include a prioritized list of profile update tasks associated with all the successful user profile pages of the entire member base of the networking website. In all 1203, the task prioritization module 204 may display a prompt inviting the user to update their profile page, based on the task prioritization list accessed in 1202.

In this example, the task prioritization list may be generated based on analytics of all the successful user profile pages in the entire member base. For example, with reference to method 1800 illustrated in FIG. 18, in 1801 the determination module 202 may identify all of the users associated with the member base of the networking website (i.e., all of the users of the networking website). In 1802, the task prioritization module 204 may classify a subset of all the user profile pages in the entire member base as successful member segment user profile pages. In 1803, the task prioritization module 204 may generate a list of common characteristics of the successful member segment user profile pages in the entire member base, in order to generate the task prioritization list associated with the entire member base.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 19:
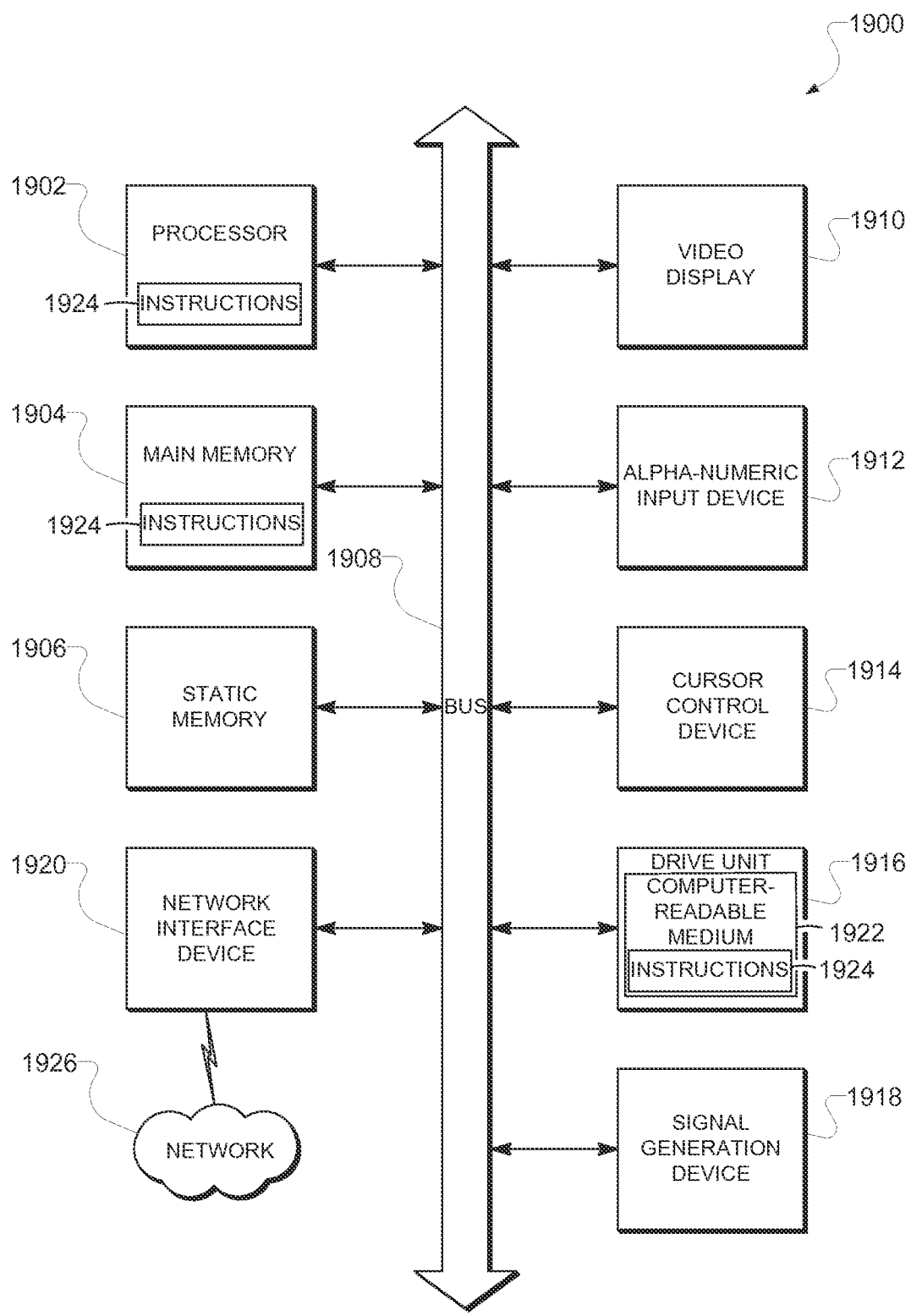
FIG. 19 is a diagrammatic representation of machine in the example form of a computer system within which a set of instructions, for causing the machine to perform any one or more of the methodologies discussed herein, may be executed.

FIG. 19 is a block diagram of machine in the example form of a computer system 1900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard or a touch-sensitive display screen), a user interface (UI) navigation device 1914 (e.g., a mouse), a disk drive unit 1916, a signal generation device 1918 (e.g., a speaker) and a network interface device 1920.

Machine-Readable Medium

The disk drive unit 1916 includes a machine-readable medium 1922 on which is stored one or more sets of instructions and data structures (e.g., software) 1924 embodying or utilized by any one or more of the methodologies or functions described herein. The instructions 1924 may also reside, completely or at least partially, within the main memory 1904 and/or within the processor 1902 during execution thereof by the computer system 1900, the main memory 1904 and the processor 1902 also constituting machine-readable media.

While the machine-readable medium 1922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1924 may further be transmitted or received over a communications network 1926 using a transmission medium. The instructions 1924 may be transmitted using the network interface device 1920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method performed by one or more processors, the method comprising:
    determining that a particular user is associated with a particular member segment of a networking website, based on content of a particular user profile page associated with the particular user;
    receiving, via a user interface, a user specification of a definition of a successful member segment profile page, including at least one of a view count threshold, a search result visibility ranking threshold, and a connection number threshold;
    accessing, using the one or more processors, a task prioritization list associated with the particular member segment, the task prioritization list including a prioritized list of profile update tasks associated with a subset of user profile pages of the particular member segment that are determined to be successful member segment user profile pages of the particular member segment, based on the user-specified definition; and
    displaying a prompt that invites the particular user to update the particular user profile page, based on the task prioritization list.

2. The method of claim 1, wherein the particular member segment corresponds to users of the networking website that are associated with a specific career track.

3. The method of claim 1, further comprising:
    determining a highest priority task in the task prioritization list that is applicable to the particular user profile page; and
    displaying the determined task in the prompt.

4. The method of claim 1, further comprising:
    detecting that the particular user has completed or skipped a task in the task prioritization list;
    revising user task history information associated with the particular user based on the detected user action; and
    displaying a prompt identifying a next applicable task in the task prioritization list, based on the user task history information.

5. The method of claim 4, further comprising:
    detecting subsequent user login to the networking website;
    accessing the user task history information associated with the particular user; and
    displaying the prompt identifying the next applicable task in the task prioritization list, based on the user task history information.

6. The method of claim 1, wherein the prompt identifies at least one of: the particular member segment associated with the particular user; and an advantage of performing a task in the task prioritization list.

7. The method of claim 1, wherein the prompt includes a reference link to a user profile completion webpage that includes instructions for updating the first user profile page.

8. The method of claim 1, wherein the particular user is determined to be associated with the particular member segment, based on at least one of an experience listing and an education listing included in the particular user profile page.

9. The method of claim 1, wherein the task prioritization list is generated based on analytics of the successful member segment user profile pages associated with the particular member segment.

10. The method of claim 1, wherein the task prioritization list is generated by:
    associating a plurality of users with the particular member segment, based on content of a plurality of user profile pages associated with the plurality of users;

classifying a subset of the plurality of the user profile pages as the successful member segment user profile pages; and generating a list of common characteristics of the successful member segment user profile pages.

11. The method of claim 10, wherein each of the plurality of users are associated with the particular member segment based on at least one of an experience listing and an education listing included in the user profile page of the respective user.

12. The method of claim 10, wherein the subset of the plurality of the user profile pages are classified as the successful member segment user profile pages, based at least on one of: a view count associated with each user profile page in the subset; a search result visibility ranking associated with each user profile page in the subset; and a number of connections associated with each user profile page in the subset.

13. The method of claim 1, wherein the prompt identifies a user that is connected to the particular user via the networking website and that has performed a task in the task prioritization list.

14. An apparatus comprising:
a determination module configured to:
determine that a particular user is associated with a particular member segment of a networking website, based on content of a particular user profile page associated with the particular user; and
a task prioritization module implemented by one or more processors and configured to:
receive, via a user interface, a user specification of a definition of a successful member segment profile page, including at least one of a view count threshold, a search result visibility ranking threshold, and a connection number threshold;
access a task prioritization list associated with the particular member segment, the task prioritization list including a prioritized list of profile update tasks associated with a subset of user profile pages of the particular member segment that are determined to be successful member segment user profile pages of the particular member segment, based on the user-specified definition; and
display a prompt that invites the particular user to update the particular user profile page, based on the task prioritization list.

15. The apparatus of claim 14, wherein the task prioritization module is further configured to:
determine a highest priority task in the task prioritization list that is applicable to the particular user profile page; and
display the determined task in the prompt.

16. The apparatus of claim 14, wherein the task prioritization module is further configured to:
detecting that the particular user has completed or skipped a task in the task prioritization list;
revise user task history information associated with the particular user based on the detected user action; and
display a prompt identifying a next applicable task in the task prioritization list, based on the user task history information.

17. The apparatus of claim 16, wherein the task prioritization module is further configured to:
detect subsequent user login to the networking website;
access the user task history information associated with the particular user; and
display the prompt identifying the next applicable task in the task prioritization list, based on the user task history information.

18. The apparatus of claim 14, wherein the apparatus is further configured to generate the task prioritization list by:
associating a plurality of users with the particular member segment, based on content of a plurality of user profile pages associated with the plurality of users;
classifying a subset of the plurality of the user profile pages as the successful member segment user profile pages; and
generating a list of common characteristics of the successful member segment user profile pages.

19. The apparatus of claim 18, wherein the task prioritization module is further configured to associate each of the plurality of users with the particular member segment, based on at least one of an experience listing and an education listing included in the user profile page of the respective user.

20. A non-transitory machine-readable storage medium having embodied thereon instructions executable by one or more machines to perform operations comprising:
determining that a particular user is associated with a particular member segment of the networking website, based on content of a particular user profile page associated with the particular user;
receiving, via a user interface, a user specification of a definition of a successful member segment profile page, including at least one of a view count threshold, a search result visibility ranking threshold, and a connection number threshold;
accessing a task prioritization list associated with the particular member segment, the task prioritization list including a prioritized list of profile update tasks associated with a subset of user profile pages of the particular member segment that are determined to be successful member segment user profile pages of the particular member segment, based on the user-specified definition; and
displaying a prompt that invites the particular user to update the particular user profile page, based on the task prioritization list.

* * * * *